March 7, 1950

R. C. DEHMEL 2,499,990

PHOTOELECTRIC APPARATUS FOR SIMULATING
RADIO RANGE SIGNALS

Filed April 10, 1946

INVENTOR.
Richard Carl Dehmel

March 7, 1950

R. C. DEHMEL 2,499,990

PHOTOELECTRIC APPARATUS FOR SIMULATING
RADIO RANGE SIGNALS

Filed April 10, 1946

INVENTOR.
Richard Carl Dehmel
BY
ATTORNEY

Patented Mar. 7, 1950

2,499,990

UNITED STATES PATENT OFFICE 2,499,990

PHOTOELECTRIC APPARATUS FOR SIMU-
LATING RADIO RANGE SIGNALS

Richard Carl Dehmel, Summit, N. J.

Application April 10, 1946, Serial No. 660,909

9 Claims. (Cl. 35—10.2)

My invention relates to apparatus for use with aviation training devices and particularly to means whereby signals adapted to represent those of an airway radio range system may be automatically varied in accordance with the course of the simulated flight of the trainer.

In one well-known type of trainer, standard aircraft instruments are operated pneumatically and the radio signals are varied manually by an attending instructor who observes the movement of a three-wheeled traveling flight path recorder and attenuates the signals to represent those received by a pilot actually flying the course being simulated by the student. In my United States Patent No. 2,366,603, granted January 2, 1945, for "Aircraft training apparatus," I have described another type of aircraft trainer utilizing a pantographic flight course charting device.

It is the object of the present invention to provide means whereby the simulated airway radio signals of an aviation trainer are automatically regulated by moving an attenuating device for the signals with respect to a modulating surface having a parameter varying according to the field strength distribution of the airway signals, the motion between the attenuating device and the surface being a scanning movement controlled by the travel of the aircraft position indicating element of the trainer.

It is a feature of my present invention that the signals may be controlled by scanning apparatus responsive to changes in light intensity.

It is another feature of my invention that signals adapted to represent those from several radio transmitters or radio channels, such as the quadrature A and N or E and T signals of an airway, may each be separately controlled by a scanning device and combined in a common receiver circuit for the student.

Another feature of my invention resides in the provision of facilities for automatically operating audible or visual fan and station marker signals by means of a scanning device operated over a modulating surface by the movement of the aircraft position indicating element of the trainer.

These and many other features of the invention, such as novel means for introducing the effects of wind drift and rotating the scanned elements to change the direction of wind drift will be more clearly understood by reference to the following text and the drawing in which practical commercial embodiments of the invention are shown. It is to be clear, of course, that such illustrations are primarily for purposes of disclosure and that the structures may be modified in various respects without departure from the broad spirit and scope of the invention hereinafter defined and claimed.

This application is a continuation-in-part of my abandoned application Serial No. 501,009, filed September 2, 1943, for "Automatic signal controlling apparatus for aircraft training devices," which is in turn a division of the application Serial No. 423,824, filed December 20, 1941, that matured into my above-referred to Patent No. 2,366,603.

Parts in the specification and drawing will be identified by specific names for convenience, but these are intended to be as generic in their application to similar parts as the art will permit.

Like reference characters denote like parts in the several figures in the drawing of which:

Figure 1:
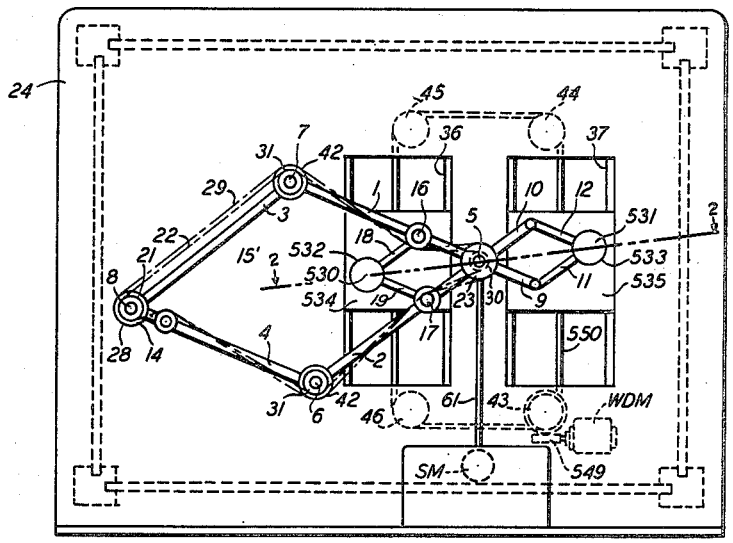
Fig. 1 is a plan view of the flight course charting device and traversing table of an aircraft trainer modified to embody the present invention.

The application of the invention is not to be limited to any particular type of trainer as it can be adapted to use with electrically, fluid, or mechanically operated training systems and with a variety of flight-indicating or recording devices. For convenience, one form of the invention will be described wherein it is adapted to a trainer of the type disclosed in my patent referred to above. The flight path indicator of this trainer is illustrated in Fig. 1 as being of the pantograph type. The main pantograph 15′ comprises four arms, 1, 2, 3 and 4, pivoted together at their junctions by pivots 5, 6, 7, and 8. The arms 1 and 2 have short extensions, 9 and 10, to the ends of which pantograph arms 11 and 12 are pivoted, the latter arms being pivoted together at their junction by a scanning element 531, more fully disclosed in the following text. Also pivoted to the arms 1 and 2 by pivots 16 and 17 are two additional pantograph arms 18 and 19 at the junction point of which is a scanning element 530.

Figure 2:
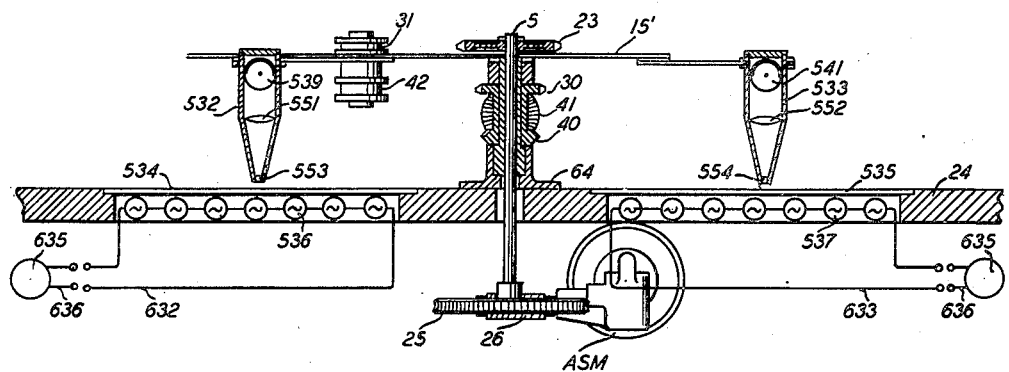
Fig. 2 is a sectional view on line 2—2 of Fig. 1 and shows the apparatus adapted to the photoelectric method of signal controlling.

At the junction point 8 is located a driving head 14 which has a tractor wheel (not shown) driven by a sprocket wheel 21, Fig. 1, and through the sprocket chain 22, Fig. 1, by the driving sprocket wheel 23, Figs. 1 and 2, which is secured to the upper end of the pivot shaft 5, Fig. 2. This shaft is mounted for rotation in a bearing secured to the table 24 and is driven by worm gear 25, in turn driven by the worm 26 mounted on the shaft of the motor ASM, which rotates under control of the trainer circuits at a speed corresponding to the speed of the simulated flight. To guide the chain 22, Fig. 1, idler pulleys 31, Figs. 1 and 2, are rotatably mounted on the pivots 6 and 7 of the pantograph.

The tractor wheel, referred to above, is mounted in a longitudinally disposed axle rotatably supported in the lower end of the driving head 14 which is itself rotatable about its vertical axis to orient said wheel in response to the operation of the trainer in the simulation of steering. To rotate the driving head 14, Fig. 1, sprocket wheel 28 is attached thereto and is driven by a sprocket chain 29, driven by a driving sprocket 30, Figs. 1 and 2. Sprocket 30 is mounted to rotate freely with respect to the pivot shaft 5 and is in turn driven through bevel gearing 40 and 41, Fig. 2, by the shaft 61, Fig. 1, driven by the steering motor SM of the trainer. The speed of the steering motor SM is proportional to the turning rate of the aircraft and is controlled by circuits of the trainer. To guide the chain 29, idler pulleys 42, Figs. 1 and 2, are rotatably mounted on the pivots 6 and 7 of the pantograph.

Thus, through the operation of the motor ASM, the driving head 14 is advanced over the surface of the table 24 at a speed proportional to the indicated airspeed and is oriented to determine the direction of its movement under the control of motor SM, and, because of the pantographic construction, the scanning units 530 and 531 are moved proportionately over the elements 534 and 535 representing the field of the airway system.

The cord 550 driven by the motor WDM moves the elements 534 and 535 in their guides 36 and 37 to introduce the effects of wind drift on the radio signals. Pulley 43 is driven by worm gearing 549 from motor WDM and drives the cord 550 around idlers 44, 45, and 46 supported from table 24. The magnitude of wind drift is proportional to the speed of the motor WDM. The direction of wind drift is determined by the orientation of elements 534 and 535 which may be angularly adjusted in any suitable manner for this purpose on their supports in guides 36 and 37 respectively.

As is well known, there are commonly two transmitting channels at an airway radio range station. One of these is the A channel whereby coded signals are directionally transmitted into one pair of substantially opposite quadrants, and the other is the N channel whereby coded signals are directionally transmitted into a second pair of opposite quadrants. The field strength distribution of the signal in each quadrant is such that the intensity is a maximum along the axis of the quadrant, fading off on either side and also decreasing in intensity with distance from the station. It builds up rapidly as the station is approached, the rate of build-up increasing to a surge near the center of the station and then decreasing suddenly to zero to form a cone of silence over the station.

*Photoelectric signal controller*

Figure 3:
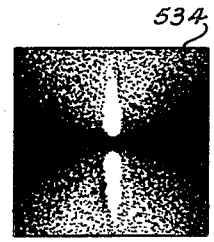
Fig. 3 is a plan view of the variable density plate used with the photoelectric method of signal controlling.

The variation in signal strength for one of the above-described channels is illustrated in Fig. 3 wherein the light areas are the regions of maximum signal intensity and the dark areas regions where the signal strength is a minimum. It is possible therefore to represent the field strength distribution of each channel of a radio range station by a variably shaded plate, the change in shading being the parameter which represents the change in field strength. In many range stations the quadrants of a channel are symmetrical and diametrically opposed. In other stations the quadrants are dissimilar and subtend an angle other than 180°. Either type of station may be represented by an appropriately shaded plate. Also, in some stations the two channels each subtend an angle of arc such that only two on-course legs are formed. In any case shaded plates may be used to provide an automatic control of the radio range signals in training apparatus.

Referring to Figs. 1 and 2, the pantograph 15' is operated by the ASM and SM motors, as above described, and includes scanning elements 530 and 531. These elements comprise photoelectric cells 539 and 541, Fig. 2, mounted in tubular casings 532 and 533 respectively on opposite sides of the support 64 to move with the charting device 14, Fig. 1. The casings are provided with light focusing lenses 551, 553 and 552, 544 respectively.

The plates 534 and 535 for representing the A and N signal intensities may be negatives obtained by photographing reverse images of drawings, such as that shown in Fig. 3, and are positioned so that the axes of the main beam patterns are approximately at right angles to each other, although the angular relationship may vary as previously stated. The lamps 536 and 537 are energized from the power source 635 and project light through the plates to the cells. As the cells move from point to point over the plates, the current through the cells will vary in accordance with the variation in the field strength distribution on the corresponding radio range. That is, the current in cell 539 may for example represent the A signal intensity and the current in cell 541 the N signal intensity. The light from lamps 536 and 537 is made to uniformly illuminate the plates 534 and 535 by placing a sheet of ground or opal glass between said lamps and said plates.

Alternatively, lamps 536 and 537 may be mounted above, instead of below, the plates. In this case the plates would take the form of surfaces having reflecting properties varying in the same manner as the transmission of the plates described above.

It will be understood that the arrangement of lights, plates and cells shown in Figs. 1 and 2 is merely illustrative and that this construction may be modified in various ways. For example, the scanning cells may be fixed and the plates moved by the pantograph 15' or the pantograph may be eliminated and either the scanning or scanned elements may be driven directly by a course charting device, such as the Link recorder cited, referring to United States Patent No. 2,179,663.

Figure 4:
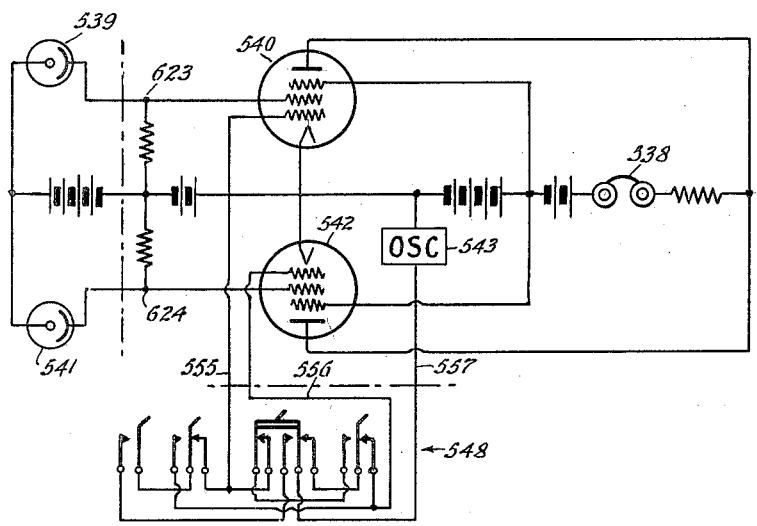
Fig. 4 is a circuit used in conjunction with Fig. 2.

In Fig. 4 is illustrated one form of amplifier and a signal coding unit 548 which may be used in combination with photoelectric cells 539 and 541 to furnish suitably attenuated and interrupted signals from oscillator 543 to the pilot's receiver 538.

The photoelectric cells 539 and 541 are connected by conductors 623 and 624 respectively to control grids of the thermionic tubes 540 and 542 so as to vary the oscillator tone in the student pilot's headphones 538 according to the respective cell current. The oscillator is connected at one common terminal to the cathodes of both tubes, and at the other terminal by conductor 557 to the coding unit 548. The coding unit operates in the conventional manner alternately to key station identification with the A and N signals and is connected by conductors 555 and 556 to control grids of tubes 540 and 542 respectively for controlling current flow in the tube plate circuits which include the receiver 538.

*Fan markers*

These scanning elements may be used in a similar manner to introduce fan and station markers. In these arrangements, separate scanning elements which are supplementary to the A and N channel elements are operated from duplicating members of the pantograph. When the supplementary scanning elements are operated to the appropriate position, audible and/or visual fan markers may be surged in and out by corresponding variations in the parameter of the scanned element at the locations where markers are to occur.

Figure 5:
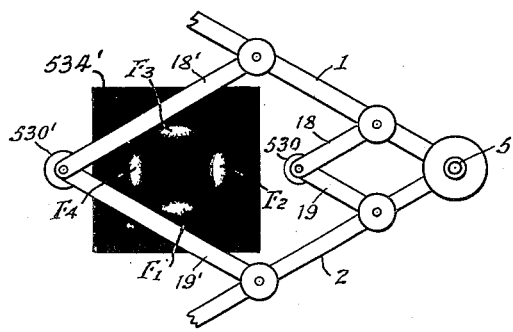
Fig. 5 is a fragmentary view of pantograph structure having a light-sensitive scanning element for introducing fan marker signals.

Fig. 5 illustrates such an arrangement wherein a supplementary scanning element 530' is carried on the main arms 1 and 2 of the pantograph by means of the auxiliary links 18' and 19' so as to duplicate on a larger scale the movement of the range scanning element 530. The element 530' which includes light-sensitive means, such as a photocell, is movable with respect to a fan marker pattern 534' having dark or opaque areas except for light transmitting areas F1, F2, F3 and F4 representing the positions of fan markers on different beams converging on the station. Accordingly, when the photocell passes over one of the fan marker areas, the cell current is caused to vary with the position of the scanning element. It will be apparent that an amplifying circuit as shown in Fig. 4 may be used with the photocell for controlling signal reception as the cell current changes except that the audio oscillator in this case operates at 3000 cycles to simulate the typical fan marker signal tone.

In the embodiment of the invention disclosed, audio-frequency electrical circuits are employed and the circuits each provide a conservative electrical system or network; in contradistinction to the employment of relatively high frequencies in an electrical system wherein relatively substantial radiation or dissipation of energy takes place.

Having thus described my invention with particularity with reference to a preferred form, it will be obvious to those skilled in the art after understanding my invention that various changes and modifications may be made therein without departing from the spirit and scope of my invention, and I aim in the appended claims to cover such changes and modifications as are within the scope of the invention.

What is claimed is:

1. The combination with an aviation ground trainer for simulating the flight of an aircraft, of a remotely located position indicating carriage movable responsive to operation of the trainer by a student, of means projecting a pattern of light of variable intensity over the area in which said carriage is movable, means including photoelectric means attached to the carriage for producing an electric current of a strength depending on the intensity of light received by said photoelectric means and signal means operated by said electric current.

2. The combination with an aviation ground trainer for simulating the flight of an aircraft, of a position charting carriage movable in response to operation of the trainer by a student, of means projecting a pattern of light of variable intensity representing the field pattern of a radio range over the area in which said carriage is movable, means including photoelectric means attached to the carriage for producing an electric current of a strength depending on the intensity of light received by said photoelectric means and signal means operated by said electric current.

3. The combination with an aviation training device of the type which includes a position charting carriage movable in response to operation of the training device by a student, of means projecting a pattern of light of variable intensity over the area in which said carriage is movable, means including photoelectric means attached to the carriage for producing an electric current of a strength depending on the intensity of light received by said photoelectric means, and signal means operated by said electric current.

4. In aircraft training apparatus, a charting device adapted to be operated by a pupil with respect to a position representing a radio range station, a source of signals adapted to represent those of a radio range, a receiver therefor, and means for modulating the signals comprising a plate having a light-transmitting characteristic which varies in accordance with the field strength distribution of the range, fixed means for projecting light through said plate, a scanning device comprising a photoelectric cell responsive to the projected light pattern for determining the instantaneous amplitude of the signals and means for producing relative motion between the scanning device and the plate in accordance with movement of said charting device.

5. The combination with an aviation ground trainer for simulating the flight of an aircraft, of position indicating means controlled in response to operation of the trainer by a student, of means having a variable light transmitting pattern for representing a radio signal field pattern over the area traversed by said indicating means, a fixed source of light at one side of said pattern means and photoelectric means disposed at the opposite side thereof for producing an electric current depending in strength on the intensity of light received by said photoelectric means, said photoelectric means and said pattern means being relatively movable in accordance with the control of said indicating means, and signal means operated by said electric current.

6. The combination with an aviation ground trainer for simulating the flight of an aircraft, of a position indicating member movable in response to operation of the trainer by a student, a fixed transparency having a variable light transmitting pattern for representing radio signal intensity in the area in which said member is movable, a fixed source of light disposed at one side of said transparency and photoelectric means arranged to receive projected light therefrom for producing an electric current depending in strength on the intensity of light received, said photoelectric means being movable in accordance with the movement of said member and means operated by said electric current for representing radio signals.

7. The combination with an aviation ground trainer for simulating the flight of an aircraft, of position indicating means movable in response to operation of the trainer by a student, a pair of fixed transparencies each having a variable light transmitting pattern for representing a radio range field pattern over the area in which said indicating means is movable and a fixed source of light disposed at one side of each of said transparencies and a photoelectric cell disposed at the opposite side of each of said transparencies, said photoelectric cells each being arranged to produce an electric current of a strength depending on the intensity of projected light received by the respective cell, said cells being simultaneously movable in accordance with the movement of said indicating means for scanning said transparencies respectively, and means responsive to the electric current of each cell respectively for producing distinguishing radio range simulating signals.

8. In aircraft training apparatus, the combination of a charting head operable by a pupil, a chart representing a radio range with respect to which the charting head may be moved, a source of signals adapted to represent a plurality of radio range beacon signals, a receiver for said signals, a plurality of elements corresponding respectively to said beacon signals and each having a transparency pattern which varies in accordance with the field strength distribution of the respective signals to which it corresponds, fixed sources of light for illuminating said elements, a plurality of light sensitive scanning units cooperatively associated with respective of said elements for determining the instantaneous value of said signals, and a linkage operatively connecting said charting head and said plurality of scanning units for simultaneous movement in a predetermined ratio.

9. In aircraft training apparatus for simulating the flight of an aircraft with respect to one or more fan marker radio stations, the combination with a course charting device adapted to be operated by a pupil, a source of fan marker simulating signals and a receiver therefor, of means for controlling said signals in accordance with the simulated flight position of the course charting device comprising an element having a transparency pattern for simulating the location of the one or more stations, said pattern corresponding to respective marker field patterns, a fixed source of light for illuminating said element, a light-sensitive scanning device responsive to light variable according to said pattern for controlling the instant amplitude of the received signals, and an operative connection between the charting device and said scanning device for producing relative motion between the scanning device and the element.

RICHARD CARL DEHMEL.

REFERENCES CITED

The following references are of record in the file of this patent:

UNITED STATES PATENTS

| Number | Name | Date |
|---|---|---|
| 2,010,833 | Willoughby | Aug. 13, 1935 |
| 2,164,412 | Koster | July 4, 1939 |
| 2,165,236 | Dewan | July 11, 1939 |
| 2,199,066 | Bernstein | Apr. 30, 1940 |
| 2,226,726 | Kramer | Dec. 31, 1940 |
| 2,243,600 | Hulst | May 27, 1941 |
| 2,312,962 | DeFlorez | Mar. 2, 1943 |
| 2,389,359 | Grow | Nov. 20, 1945 |
| 2,454,503 | Crane | Nov. 23, 1948 |